US010349652B2

(12) United States Patent
Bartscher

(10) Patent No.: US 10,349,652 B2
(45) Date of Patent: Jul. 16, 2019

(54) DEVICES FOR DRIVING AWAY OR EXTERMINATING PESTS

(71) Applicant: BARTSCHER INNOVATIONSTECHNOLOGIEN GMBH, Köln (DE)

(72) Inventor: Gerhard Bartscher, Köln (DE)

(73) Assignee: BARTSCHER INNOVATIONSTECHNOLOGIEN GMBH, Köln (DE)

( * ) Notice: Subject to any disclaimer, the term of this patent is extended or adjusted under 35 U.S.C. 154(b) by 0 days.

(21) Appl. No.: 15/740,182

(22) PCT Filed: Jun. 22, 2016

(86) PCT No.: PCT/DE2016/100283
§ 371 (c)(1),
(2) Date: Dec. 27, 2017

(87) PCT Pub. No.: WO2017/005242
PCT Pub. Date: Jan. 12, 2017

(65) Prior Publication Data
US 2018/0310544 A1    Nov. 1, 2018

(30) Foreign Application Priority Data

Jul. 7, 2015    (DE) .................. 10 2015 110 989

(51) Int. Cl.
*A01M 1/00* (2006.01)
*A01M 1/24* (2006.01)
(Continued)

(52) U.S. Cl.
CPC ............. *A01M 29/34* (2013.01); *A01M 1/00* (2013.01); *A01M 1/24* (2013.01); *A01M 29/12* (2013.01);
(Continued)

(58) Field of Classification Search
CPC .......... E04B 1/72; A01M 1/24; A01M 1/245; A01M 29/34; A01M 29/12; A01M 29/30; A01M 1/205
See application file for complete search history.

(56) References Cited

U.S. PATENT DOCUMENTS

| 4,944,110 A | * | 7/1990 | Sims | ........................ E04B 1/72 43/124 |
| 5,937,572 A | * | 8/1999 | Neumann | ............. A01M 13/00 43/132.1 |

(Continued)

FOREIGN PATENT DOCUMENTS

| DE | 4444295 A1 | 6/1996 | |
| DE | 29921736 U1 | * 3/2000 | ............ A01M 29/34 |

(Continued)

OTHER PUBLICATIONS

International Search Report for PCT/DE2016/100283, ISA/EP, Rijswijk, NL, dated Oct. 24, 2016.

(Continued)

*Primary Examiner* — Christine T Cajilig
(74) *Attorney, Agent, or Firm* — Harness, Dickey & Pierce, P.L.C.

(57) ABSTRACT

The present invention relates to devices for exterminating and/or driving away pests, more particularly insects, preferably Nematocera and Brachycera. The fundamental inventive idea is that of using individual small drops to exterminate or drive away pests. Risk to humans is advantageously avoided.

19 Claims, 3 Drawing Sheets

Figure 1:
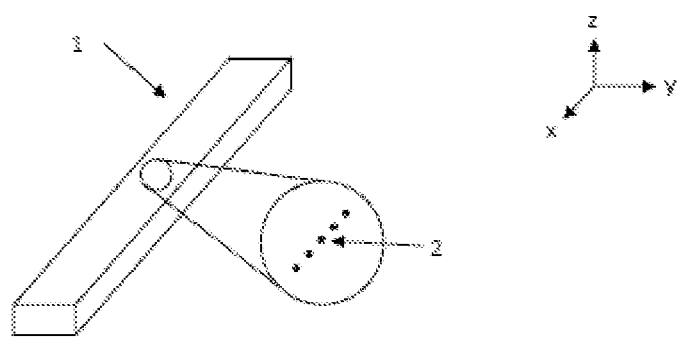

(51) Int. Cl.
    *B05B 9/03*         (2006.01)
    *A01M 29/12*      (2011.01)
    *A01M 29/30*      (2011.01)
    *A01M 29/34*      (2011.01)
    *B05B 12/12*      (2006.01)

(52) U.S. Cl.
    CPC ....... *A01M 29/30* (2013.01); *A01M 2200/012* (2013.01); *B05B 9/035* (2013.01); *B05B 12/124* (2013.01)

(56) References Cited

U.S. PATENT DOCUMENTS

| | | | | |
|---|---|---|---|---|
| 6,230,660 | B1* | 5/2001 | Greeson | A01K 13/003 119/656 |
| 6,653,971 | B1* | 11/2003 | Guice | A01M 1/026 342/22 |
| 7,066,218 | B1* | 6/2006 | Fleming | A01M 1/2038 141/198 |
| 7,201,916 | B2* | 4/2007 | Schiavo | A01M 1/2077 424/40 |
| 7,739,828 | B2* | 6/2010 | Baird, III | A01M 7/0032 43/132.1 |
| 9,044,522 | B2* | 6/2015 | Gasper | A01M 1/2038 |
| 2001/0054962 | A1* | 12/2001 | Barber | A01M 1/026 340/573.2 |
| 2003/0140550 | A1* | 7/2003 | Seniff | A01M 5/08 43/141 |
| 2005/0195224 | A1* | 9/2005 | Tomotake | B41J 2/1433 347/5 |
| 2006/0086823 | A1* | 4/2006 | Colarusso | A01G 13/06 239/337 |
| 2007/0175086 | A1* | 8/2007 | Baird, III | A01M 7/0032 43/132.1 |
| 2008/0034644 | A1* | 2/2008 | Eldridge | A01M 1/245 43/124 |
| 2009/0084023 | A1 | 4/2009 | Seniff | |
| 2009/0241410 | A1 | 10/2009 | Baird, III | |
| 2013/0047497 | A1* | 2/2013 | White | E04B 1/72 43/131 |
| 2014/0299069 | A1* | 10/2014 | Greeson | A01G 9/102 119/651 |

FOREIGN PATENT DOCUMENTS

| | | |
|---|---|---|
| DE | 19932015 A1 | 1/2001 |
| DE | 102004058275 A | 6/2006 |

OTHER PUBLICATIONS

Written Opinion of the ISA for PCT/DE2016/100283, ISA/EP, Rijswijk, NL, dated Oct. 24, 2016.

\* cited by examiner

DEVICES FOR DRIVING AWAY OR EXTERMINATING PESTS

CROSS-REFERENCE TO RELATED APPLICATIONS

This application is a 371 U.S. National Stage of International Application No. PCTDE2016/100283, filed Jun. 22, 2016. This application claims the benefit of and priority to German Patent Application No. 10 2015 110 989.1, filed Jul. 7, 2015. The disclosures of the above applications are incorporated herein by reference.

DESCRIPTION

This invention relates to devices for exterminating and/or driving away pests, particularly insects, preferably flies of the suborders Nematocera and Brachycera.

Standard traps for insects are typically "boxes" that attract the insects by UV light and possibly heat and/or pheromones. Three mechanisms are customarily employed for capture and/or extermination: electrically charged grids, adhesive films, and suction.

All of these variants have only limited efficacy. For example, flies of the suborder Nematocera are not readily attracted by the aforementioned techniques, and increasingly beneficial insects are also exterminated.

Insect sprays (in spray cans, for example) as well as devices that gradually release insecticides in vapor form are also customarily used. A substantial disadvantage with both systems is human exposure to the insecticide, which is frequently also harmful to humans in the long run.

Diverse methods and devices for exterminating insects are described in the patent literature.

CN000002432784Y describes a spray gun having a reservoir, which operates with hot water to exterminate insects. The device must be operated by a person. Furthermore, the volume of sprayed water is high enough to cause injuries to people in the event of improper handling.

CN000102893979A discloses a detector for use with a garden pond that reacts to the noise of mosquitos and generates a water spray for driving away and/or killing the mosquitos.

Although this is an automatically operating system, the volume of the water used typically prohibits a use inside buildings. Furthermore, the water volume is also not pleasant for people nearby.

JP2007252274 describes a type of "canon", which is aimed by remote control (e.g., by a camera) and selectively shoots insecticide, smoke, or both. This device also has the disadvantage of using greater and thus potentially harmful quantities of insecticide.

DE10200600273B3 discloses methods and devices for the manipulation of a flying insect. A space is acoustically monitored for the presence of a flying insect, wherein sound frequencies characteristic of the flying insect are detected. The insect is then shot down, for example by two laser rays.

The following additional patent documents teach the use of laser rays for insect control purposes:
WO2012171445, KR102010036417, U.S.020130167429, US53435652, DE3825389 and JP000H06197674.

Although measures for minimizing risks to humans are described in the aforementioned documents, there is still a residual risk because rays with sufficient power to exterminate or drive away pests can also be hazardous to humans, especially to the eyes.

Hence there is a need for technical solutions for controlling pests, specifically insects, that avoid the disadvantages of the prior art.

Surprisingly, it was found that pests, particularly insects, can be exterminated and/or driven away by shooting them with individual, minute droplets.

The object of this invention is therefore a device for exterminating or driving away pests, which is characterized in that it hits the pest with at least one individual, minute droplet and thus achieves the desired effect of driving away or extermination.

The fundamental inventive idea is that of using individual, small droplets for exterminating or driving away pests. A hazard to humans is thus advantageously avoided.

For generating individual droplets, use can be made in particular of technologies used in printer heads for so-called inkjet printing. Inkjet printing is one of the main printing methods for digital printing, hence suitable units for the generation of individual, microscopically small droplets are available in large quantities, in diverse variants, and at affordable prices.

According to the invention, a distinction can be made between two fundamental embodiments:

A: Killing or repelling pests by the physical impact of a single, minute droplet with high velocity. As a fluid, use can be made here of pure water in particular. This has the advantage of not having any toxicological side effects.

B: Killing or repelling pests by a single, minute droplet with an insecticide (or with another fluid having a particular functionality). The substantial advantage over the prior art is that the amount of insecticide used is extremely small, hence there is no hazard to humans.

The following consideration highlights this key aspect: A standard insecticide spray can contains, for example, 250 ml insecticide and is enough for roughly 100 shots of spray, in other words ca. 2.5 ml insecticide are dispensed per shot. In inkjet printing, droplet sizes in the range of 1 pl to 100 pl are usual, in other words even with a droplet size of 100 pl, it would take $2.5 \times 10^7$ of these droplets to equal the quantity of a single shot from an insecticide spray can.

In the context of the inventive idea, the term "pest" is generally understood to mean an unwanted animal. Specific (but non-limiting) examples are in particular insects, especially flying insects such as flies of the suborders Nematocera or Brachycera, and also birds or rodents.

Use may be made of various additives for the fluid according to fundamental embodiment B, depending upon the area of application. Mention has already been made of an insecticide. The type and activity of the insecticide are adapted to the droplet size and the type of pest.

Examples of suitable insecticides according to the invention include:

Chlorinated insecticides such as camphechlor, DDT, hexachlorocyclohexane, gamma-hexachlorocyclohexane, methoxychlor, pentachlorophenol, TDE, Aldrin, Chlordane, chlordecone, Dieldrin, endosulfan, Endrin, heptachlor, Mirex, and mixtures thereof;

Organophosphorous insecticides such as acephate, azinphos-methyl, bensulide, chlorethoxyfos, chlorpyrifos, chlorpyriphos-methyl, diazinon, dichlorvos (DDVP), dicrotophos, dimethoate, disulfoton, ethoprop, fenamiphos, fenitrothion, fenthion, fosthiazate, malathion, methamidophos, methidathion, methylparathion, mevinphos, naled, omethoate, oxydemeton-methyl, parathion, phorate, phosalone, phosmet, phostebupirim, pirimiphos-methyl, profenofos, terbufos, tetrachlorvinphos, tribufos, trichlorfon, and mixtures thereof;

Carbamates such as aldicarb, carbofuran, carbaryl, methomyl, 2-(1-methylpropyl)phenyl methylcarbamate, and mixtures thereof;

Pyrethroids such as allethrin, bifenthrin, deltamethrin, permethrin, resmethrin, sumithrin, tetramethrin, tralomethrin, transfluthrin, and mixtures thereof;

Plant toxins such as derris (rotenone), pyrethrum, neem (azadirachtin), nicotine, caffeine, and mixtures thereof.

In the scope of this invention, the use of alternative functionalities is also possible, for example an adhesive material that causes the wings of a flying insect to stick together or plugs up the spiracles to a substantial extent. Generally materials that exert a harmful effect on the pest can be used in this case, since they are applied directly to the pest in a targeted manner, and in extremely minute quantities that are completely harmless to people.

According to the prior art, e.g., in inkjet printing, additional functional additives may also be added to the fluid. Examples of such include surfactants, which alter the surface tension of the fluid such that optimum droplets are formed upon discharge.

A key aspect in both fundamental embodiments is that the droplet hits the pest in a targeted manner. This is accomplished in a process comprising three steps:
1. Detection of the position of the pest
2. Calculation of the actions necessary for the shot
3. Shot With regard to this invention, there are the following implementation possibilities for step 1:

The prior art contains many options for detecting the position of pests. Optical, acoustic, and capacitive systems are specific examples.

Examples of optical systems include cameras (in particular CCD cameras, specifically 2D chip or line scan camera systems typically comprising at least two cameras for spatial acquisition, optionally with image recognition procedures) and scanners (in particular laser scanners). Use may also be made of simpler systems such as light barriers. Use may be made of different wavelengths here. The IR range, which is invisible to the human eye, is particularly advantageous in this case.

In the case of acoustic systems, there are active and passive elements. Microphones are passive elements. As far as evaluating the signals is concerned, for flying insects in particular it is possible to analyze characteristic frequencies such as the wing beat of flies of the suborders Nematocera or Brachycera. Ultrasound is generally used in active acoustic systems. A transducer emits an acoustic wave. Corresponding detectors capture the reflection from the object and enable the spatial position thereof to be determined by means of a suitable signal processing. In nature, bats use such systems.

Capacitive systems typically only permit a substantially less exact position detection. However, it fully suffices for one of the embodiments described further below. Prior art technologies similar to those in smartphones can be used in this case.

For further clarification of the inventive idea, individual preferred embodiments in order of increasing complexity shall be described in detail in the following, with reference to drawings.

EMBODIMENT A: BAR

FIG. 1 shows a device according to the inventive idea in the shape of a bar (1), i.e., an essentially linear arrangement in the sense of the inventive idea. This specific embodiment will also be used to explain a series of more general aspects of the inventive idea.

For a clear illustration, an example of a bar (1) having a length of 0.5 m, a width of 10 mm, and a thickness of 5 mm was chosen here. On the top surface of the bar are situated a plurality of minute nozzles (2), for example ones known from inkjet printing. These nozzles are illustrated schematically in a detail magnification in FIG. 1. The diameter of the exit opening of the nozzles is typically in the range of 10 to 100 µm. Because the production of individual nozzles on the basis of inkjet printing technologies is comparatively inexpensive, use can be made of a large number of such nozzles. For example, the nozzles can be arranged in intervals of ca. 2 mm. In the case of a length of 0.5 m, this results in ca. 250 nozzles for the entire bar.

Nozzles and/or nozzle arrays that are suitable according to the invention can be constructed similarly to those of the printer heads commercially available for inkjet printing, for example types 126 and 128 (Xaar) or the KJ4B series (Kyocera).

In a fundamental embodiment, the direction in which the droplets are expelled from the bar is established by the design. In most cases it will be perpendicular to the top surface of the bar, i.e., in the z-direction in FIG. 1. In order to cover a larger spatial area, the nozzles can also be arranged at different angles. Arrangements suitable for the intended use are easy to determine for persons skilled in the art.

Smart control unit (6) and sensors (7) are used to detect the position of the pest. If the pest comes into the detection zone of the bar, calculations are performed to determine which of the available nozzles has the highest hit probability. In this process many parameters can be considered, for example the position of the bar in relation to the pest, movement direction, speed and typical movement patterns of the pest, and also air currents in the space. The optimum nozzle is then activated and emits a single droplet that hits the pest and brings about the desired effect. Control is automatic (after presetting basic parameters), without human intervention.

The presence of humans can also be considered. A consequence of the inventive idea thus described is that being struck by one or several droplets will not cause any harm to humans. However, repeated strikes by larger and faster droplets may be perceived as annoying. Thus it is possible to delay droplet emission or stop it altogether if a person is within range of the droplets. A further measure for minimizing potential annoyance to humans is setting the control unit so that it only shoots a limited number of droplets in a defined time interval, for example only one droplet per minute. This simultaneously minimizes fluid consumption.

The sensor-control system is preferably set so that it will not fire at non-moving targets.

Inkjet printing nozzles are extremely small, hence a compact design as in the embodiment described here is achieved. A reservoir with the fluid to be used (not illustrated here) is preferably disposed inside or underneath the bar 1. Cartridges that are particularly easily replaced by the user can be used here. The entire unit operates with power supplied via, for example, a mains connection, batteries, or rechargeable batteries. A combination with a solar module is advantageous for outdoor uses.

The described bar can be mounted anywhere within an enclosed space, particularly on walls and ceilings. A mounting on the ceiling is particularly advantageous because the droplets are then shot essentially downwards and thus gravity accelerates them further.

Mounting several devices distributed within the room is likewise conceivable. Depending upon the intended application, the bar can also be used outdoors. An example of this would be portions of the exterior areas of buildings from which pigeons are to be kept away. In the case of pigeons, the bar should merely be set to "repel". For use against rodents, mounting near the floor is advantageous.

A mounting of a mobile variant on items of clothing such as a belt or hat is also possible.

In another variant, the bar is moved, tilted, or turned in one or several spatial directions by actuators (8). The movement can take place continuously or in defined increments. An example of defined increments is movement of the bar by half a grid dimension in the longitudinal direction. In the embodiment specifically described here having a length of 0.5 m and nozzles at 2 mm intervals, such an increment would be 1 mm.

Depending upon the nature of the movement and with the appropriate control unit, moving the bar increases the spatial area covered and the probability of a hit. Preference is given to only a slight movement taking place in order to maintain the compact structure. Rotary motions about the longitudinal axis (the x-axis in FIG. 1), which permit large turns while maintaining a compact structure, are an exception here.

The speed of the movement is preferably fast in comparison to the movement speed of the pest in question.

In another variant, the droplet is shot within a time interval in which the nozzle array moves. An additional movement component can thus be given to the droplet, which also increases the spatial area covered and the probability of a hit.

A key physical aspect should be noted for the embodiment described here as well as for most of the ones described in the following: The range of very small droplets in the sense of the inventive idea in air is limited. If a droplet starts with an initial velocity $v_0$, this velocity then decreases due to air friction (somewhat simplified). The droplet diameter is a substantial influencing variable. The smaller the droplet, the shorter the range.

Depending upon the application, increasing the range is desirable. This can be achieved through the following measures:

As indicated above, increasing the droplet diameter
Downward movement of the droplets (gravity)
Increasing the initial velocity $v_0$
Increasing the density of the fluid used in the droplet Obviously a combination of different ones of these options is also advantageous.

In another variant of Embodiment a described here, several nozzles can be activated simultaneously for increasing the hit probability. In another variant, the exact number of nozzles activated is adjusted to the current circumstances by the control unit.

In still another preferred variant, anywhere from a plurality of nozzles to all of the nozzles are simultaneously activated. Depending upon the embodiment, groups can also be activated.

In this preferred variant, the bar can have only a small range of action, for example a range of ca. 0.5 m (x-direction)×2 mm (y-direction)×5 cm (z-direction). For example, if the sensors (7) detect a nematocerous fly in this range, all nozzles will be triggered. This system only requires a very simple control unit and is also able to make do with comparatively simple sensors. A very inexpensive device can thus be produced.

Embodiment a is a preferred variant for exterminating flying insects in enclosed, not too large spaces. With time, the probability is high that flying insects in the space will move through the detection zone and be exterminated there. Obviously this can be enhanced by a suitable positioning of the embodiment. In addition, known measures for luring pests can be employed.

The consumption of fluid and a potential annoyance to humans can also be minimized in this comparatively simple embodiment by the measures described above, e. g., by the combination of a light barrier with the detection of the wing beat frequency of flies of the suborders Nematocera or Brachycera.

An example of an advantageous use of this variant is outdoors for driving off or exterminating wasps that have nested in, for example, a shutter box. The bar (1) is mounted in direct proximity to the opening via which the wasps fly in and out so that it will drive away or exterminate incoming wasps.

Another example is mounting a bar (1) above a door crack. The bar (1) can prevent the invasion of insects in general and specifically ants.

In a variant of the described simplified embodiment, an aromatic substance such as a home fragrance can be added to the fluid in order to create a pleasing effect for humans in addition to exterminating or driving off pests. The device thus has a dual function, namely driving off or exterminating pests and disseminating a room fragrance.

In another variant, the fluid can contain a repellent in addition to or instead of the aromatic substance so that other pests are deterred along with the extermination or driving off of the targeted pest. Examples of suitable repellents include N,N-diethyl-3-methylbenzamide (trade name "DEET"), dimethyl phtalate (trade name Palatinol M, DMP), 1-piperidinecarboxylic acid-2-(2-hydroxyethyl)-1-methylpropylester as well as in particular 3-(N-n-butyl-N-acetyl-amino)-propionic acid ethyl ester (trade name Insekt Repellent® 3535 (Merck)). The repellents can be used individually as well as in combinations.

With this form of the embodiment, times and quantities for a periodically expelled fluid quantity can be programmed in the control unit. With the aid of the preceding descriptions, a person skilled in the art can adapt the composition of the fluid and the size of the reservoir to the specific application.

In inkjet printing, droplets are shot from the nozzles onto a substrate (typically paper) in very close proximity thereto. Because of the slight distance (typically less than 0.5 mm), slight deviations in the flight directions of the droplets from different nozzles are not a problem. This effect must be taken into account for devices in the scope of the inventive idea. Two approaches are proposed for doing so. In the first approach, the flight direction of each individual nozzle is ascertained during production and programmed into the control unit of the bar. The flight direction of each droplet is thus known to the control unit and can be taken into account in the target acquisition. Should there be a drift of the directions over time, a recalibration can be performed, for example as part of a maintenance service. In the second approach, the spatial dispersion of the nozzles is minimized, for example by longer channels for guiding the droplets.

EMBODIMENT B: PLATE

FIG. 2 shows a device according to the inventive idea in the form of a plate (3), in other words a two-dimensional array in the context of the inventive idea. In a specific embodiment, for example, the thickness can be 5 mm with an area of 0.5 m×0.5 m. The rest of the features are analogous to those of the bar (1) described as Embodiment a. This applies to the many variants described there as well.

Here is a description of specific properties and embodiments of the plate (3): Similarly to the bar (1), a plurality of minute nozzles (2) are situated on the top surface of the plate. The larger area of the plate (3) compared to the bar (1) makes it possible to accommodate significantly more nozzles and thus to cover a larger spatial area. The nozzles can thus be arranged in the x- as well as in the y-direction at intervals of ca. 1 cm, for example. For an area of 0.5 m×0.5 m, for example, this would be 2500 nozzles for the entire plate.

The direction in which the droplets are shot from the plate is typically established by the design. In most cases it will be perpendicular to the surface of the plate, i.e., in the z-direction. In order to cover a greater spatial area, the nozzles can be partially arranged at different angles, for example vertically in the center of the plate and pointing increasingly further outwards, the further the nozzles lie in the outer region, up to an angle of ca. 45° at the outermost edge. Depending upon the intended application, other arrangements are easy to determine for persons skilled in the art.

Similarly to the bar (1), the plate (3) can also be moved in order to increase the hit probability. A slight movement in the x-direction and in the y-direction is specifically preferred with this design. A slight tilting of the plate is also possible. Greater movements counteract the advantages of the compact design.

As with the bar (1), there is a preferred embodiment with a very limited range, simple sensor and control systems, as well as simultaneous activation of all nozzles with use of a fluid with a home fragrance and/or a repellent. Owing to the two-dimensional arrangement of the nozzles, a considerably greater range of action (for example, ca. 0.5 m (x-direction)× 0.5 mm (y-direction)×5 cm (z-direction)) is achieved with the plate (3) design than with the bar (1) design. Depending upon the intended application, persons skilled in the art can adjust and/or optimize the grid dimensions and size accordingly.

EMBODIMENT C: HEMISPHERE

Figure 3:
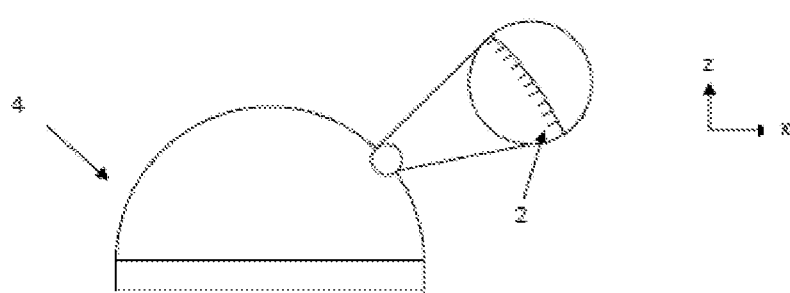

FIG. 3 shows a device according to the inventive idea in the form of a hemisphere (4), i.e., a three-dimensional arrangement in the context of the inventive idea. The illustration in FIG. 3 is a section in the x-z plane. In a specific embodiment, the diameter can be 100 mm, for example.

In this embodiment, the nozzles are preferably oriented perpendicular to the surface. Owing to the hemispherical shape, a large spatial area is covered by the plurality of nozzles. Accordingly, in the case of this embodiment it is advantageous to select a higher nozzle density than in the case of the preceding embodiments, for example one with a grid dimension of ca. 0.1 to 0.2 mm.

The spatial area covered and the hit probability can also be increased in this embodiment by a slight movement of the hemisphere 4. In this case preference is given to a slight rotary movement about the z-axis sketched in FIG. 3.

In a preferred variant, this embodiment is used as a tabletop device. In another preferred variant, the hemisphere hangs from the ceiling (with the flat side in direct contact with the ceiling).

EMBODIMENT D: GUN

Figure 4:
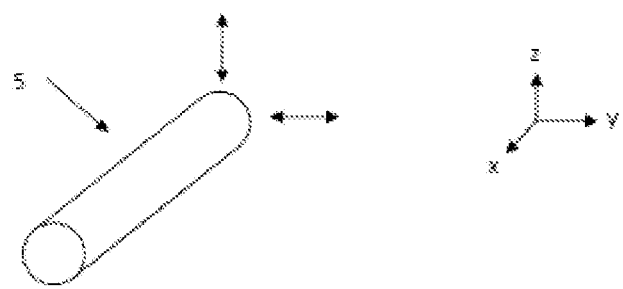

FIG. 4 shows a device according to the inventive idea in the form of a "gun" (5). In this case there is only a single nozzle, which can be turned in two axes in order to acquire the target object. An essential feature of this embodiment is that only a single nozzle is used. Accordingly, this nozzle can be more complex in design, particularly in order to achieve higher initial velocities for the expelled droplets. The nozzle can furthermore be equipped for greater hit accuracy. However, this requires a more complex actuator system and a more complex control unit.

The invention is not limited to the preceding embodiments. Instead a plurality of variants and modifications that make use of the inventive idea and therefore also come under the scope of protection are conceivable.

LIST OF REFERENCE SIGNS

1: Bar
2: Plurality of minute nozzles
3: Plate
4: Hemisphere
5: "Gun"
6: Smart control unit
7: Sensors
8: Actuators

INDEX OF FIGURES

FIG. 1: shows a device according to the inventive idea in the form of a bar (1), i.e., an essentially linear array in the sense of the inventive idea.

Figure 2:
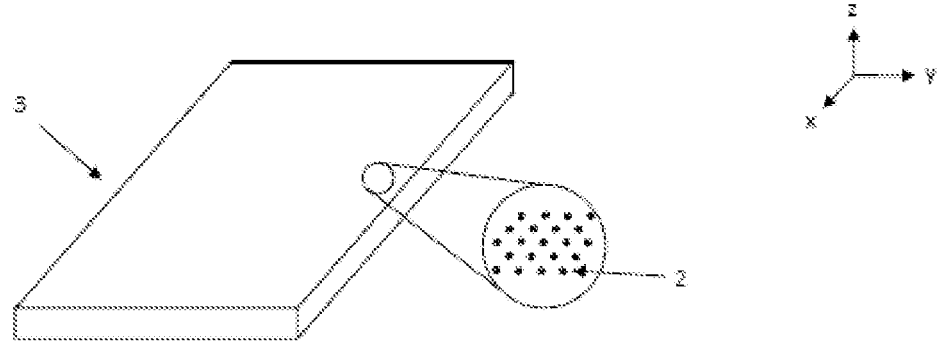

FIG. 2: shows a device according to the inventive idea in the form of a plate (3), in other words a two-dimensional array in the context of the inventive idea.

FIG. 3: shows a device according to the inventive idea in the form of a hemisphere (4), in other words a three-dimensional array in the context of the inventive idea.

FIG. 4: shows a device according to the inventive idea in the form of a "gun" (5). In this case there is only a single nozzle, which can be rotated in two axes in order to acquire the target object.

Figure 5:
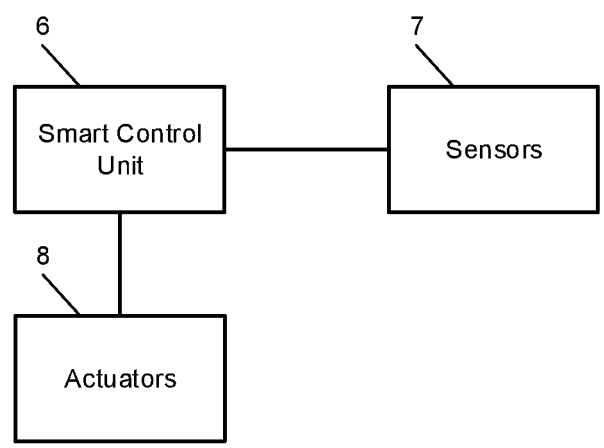

FIG. 5 illustrates a functional block diagram of the smart control unit (6), the sensors (7), and the actuators (8).

The invention claimed is:
1. A device comprising:
a plurality of sensors configured to obtain location information associated with a pest;
a smart control unit that includes a computing device, wherein the smart control unit is configured to:
determine a location of the pest based on the location information;
determine whether the location of the pest is located in a detection zone; and
in response to determining that the pest is located in the detection zone:
determine a probability for at least one nozzle, wherein each probability is associated with a likelihood that a droplet emitted from a corresponding nozzle will contact the pest; and
activate at least one nozzle based on the probability of the at least one nozzle; and
the at least one nozzle is configured to, in response to being activated, emit at least one droplet.

2. The device as claimed in claim 1, wherein a volume of each of the at least one droplet is in a range of 0.1 pl to 0.1 ml.

3. The device as claimed in claim 1, wherein the at least one nozzle is implemented by a plurality of stationary nozzles, and wherein:
in response to more than one nozzle of the at least one nozzle being activated, each of the more than one nozzle is configured to simultaneously emit one droplet toward the pest.

4. The device as claimed in claim 1, wherein the at least one droplet is composed of pure water.

5. The device as claimed in claim 1, wherein the at least one droplet includes at least one of an insecticide, an aromatic substance, and a repellent.

6. The device as claimed in claim 1, wherein the at least one nozzle is implemented by a plurality of nozzles, and the device has a form chosen from among:
a) the form of a bar with a linear arrangement of the plurality of nozzles,
b) the form of a plate with a two-dimensional arrangement of the plurality of nozzles,
c) the form of a hemisphere with a three-dimensional arrangement of the plurality of nozzles, and
d) the form of a gun with only a single nozzle, which can be rotated in two axes in order to acquire a target object.

7. The device as claimed in claim 1, wherein a spatial distribution of a fixed shooting direction of each of the at least one nozzle is in different directions.

8. The device as claimed in claim 1, wherein the plurality of sensors are configured to obtain acoustic information corresponding to a characteristic wingbeat frequency of the pest.

9. The device as claimed in claim 1, wherein the smart control unit is configured to move the device in at least one direction.

10. The device as claimed in claim 9, wherein in response to the smart control unit moving the device, the at least one nozzle is configured to emit the at least one droplet so that an additional movement direction is set.

11. The device as claimed in claim 1, wherein the device is configured to operate in enclosed spaces and/or in outdoor areas.

12. The device as claimed in claim 1, wherein in response to the at least one nozzle emitting the at least one droplet toward the pest, the device is configured to exterminate and/or repel the pest.

13. A method comprising:
obtaining, using a plurality of sensors, location information associated with a pest;
determining, using a smart control unit that includes a computing device, a location of the pest based on the location information;
determining, using the smart control unit, whether the location of the pest is located in a detection zone;
in response to determining that the pest is located in the detection zone:
determining, using the smart control unit, a probability for at least one nozzle, wherein each probability is associated with a likelihood that a droplet emitted from a corresponding nozzle will contact the pest; and
activating, using the smart control unit, at least one nozzle based on the probability of the at least one nozzle; and
emitting, using the at least one nozzle and in response to the at least one nozzle being activated, at least one droplet.

14. The method of claim 13, wherein the at least one nozzle is implemented by a plurality of stationary nozzles, and wherein the method further comprises:
simultaneously emitting, in response to more than one nozzle of the at least one nozzle being activated and using each of the more than one nozzle, one droplet toward the pest.

15. The method of claim 13, wherein the at least one droplet is composed of pure water.

16. The method of claim 13, wherein the at least one droplet includes at least one of an insecticide, an aromatic substance, and a repellent.

17. The method of claim 13, wherein obtaining the location information associated with the pest further comprises obtaining acoustic information corresponding to a characteristic wingbeat frequency of the pest.

18. The method of claim 13, wherein emitting the at least one droplet further comprises emitting, using the at least one nozzle and in response to the at least one nozzle being activated, the at least one droplet at a first velocity, and wherein in response to the at least one nozzle emitting the at least one droplet at the first velocity, the at least one droplet is configured to exterminate the pest.

19. The method of claim 13, further comprising:
determining, using the smart control unit and in response to the smart control unit determining that the pest is located in the detection zone, a probability for each of the at least one nozzle, wherein:
each probability is associated with a likelihood that a droplet emitted from a corresponding nozzle will contact the pest; and
the probability is based on at least one of (i) a position of the pest relative to a bar that includes the at least one nozzle, (ii) a movement direction of the pest, and (iii) a speed of the pest;
determining, using the smart control unit, a largest probability based on each probability;
selecting, using the smart control unit, a set of the at least one nozzle associated with the largest probability; and
activating, using the smart control unit, the set of the at least one nozzle; and
emitting, in response to the set of the at least one nozzle being activated and using each of the set of the at least one nozzle, one droplet toward the pest.

* * * * *